United States Patent [19]
Dou et al.

[11] Patent Number: 5,617,205
[45] Date of Patent: Apr. 1, 1997

[54] SPECTRAL MEASURING METHOD AND SPECTRAL MEASURING APPARATUS

[75] Inventors: Xiaoming Dou; Yoshinori Yamaguchi; Harumi Uenoyama; Yung X. Wang, all of Kyoto, Japan

[73] Assignee: Kyoto Dai-Ichi Kagaku Co., Ltd., Kyoto, Japan

[21] Appl. No.: 672,027

[22] Filed: Jun. 26, 1996

[30] Foreign Application Priority Data

Jun. 28, 1995 [JP] Japan .................................. 7-186340

[51] Int. Cl.$^6$ ............................ G01N 21/64; G01N 21/65
[52] U.S. Cl. ................... 356/301; 250/458.1; 250/459.1; 356/318
[58] Field of Search ............................ 356/301, 318; 250/458.1, 459.1, 461.1

[56] References Cited

U.S. PATENT DOCUMENTS 3,832,555  8/1974  Ohnishi .............................. 250/458.1
4,262,205  4/1981  Abu-Shumays ................... 356/318 X

*Primary Examiner*—Vincent P. McGraw
*Attorney, Agent, or Firm*—Nikaido, Marmelstein, Murray & Oram LLP

[57] ABSTRACT

Excitation light from a light source is divided into a sample beam and a correction beam by a half mirror, so that the sample beam is converged on a sample in a sample part by convergent lenses. Condenser lenses are provided in order to converge scattered light from the sample on an inlet slit of a spectroscope, and a holographic notch filter which is set to include the wavelength of the excitation light in its notch region is arranged in order to remove the same wavelength component as the excitation light from the scattered light for selecting target light. The target light and the correction beam are guided onto the same optical axis by a half mirror, to be incident upon a polychrometer through the inlet slit and simultaneously detected. The detected value of the target light is corrected by a simultaneously detected intensity of the correction beam.

10 Claims, 12 Drawing Sheets

SPECTRAL MEASURING METHOD AND SPECTRAL MEASURING APPARATUS

BACKGROUND OF THE INVENTION

1. Field of the Invention

The present invention relates to a spectral measuring method of qualitatively or quantitatively analyzing a sample by irradiating the sample with excitation light of a single wavelength and detecting fluorescence or Raman scattered light which is generated from the sample, and a spectral measuring apparatus employed therefor.

2. Description of the Background Art

Optical analyzing methods include a method called a Raman spectrometry. When certain molecules are illuminated, a small percentage of the molecules which have retained a photon do not return to their original vibration level after remitting the retained photon, but drops to a different vibrational level of the ground electronic state. The radiation emitted from these molecules will therefore be at a different energy and hence a different wavelength. This is referred to as Raman scattering.

If the molecule drops to a higher vibrational level of the ground electronic state, the photon emitted is at a lower energy or longer wavelength than that retained. This is referred to as Stokes-shifted Raman scattering. If a molecule is already at a higher vibrational state before it retains a photon, it can impart this extra energy to the remitted photon thereby returning to the ground state. In this case, the radiation emitted is of higher energy (and shorter wavelength) and is called anti-Stokes-shifted Raman scattering. In any set of molecules under normal conditions, the number of molecules at ground state is always much greater than those at an excited state, so the odds of an incident photon hitting an excited molecule and being scattered with more energy than it carried upon collision is very small. Therefore, photon scattering at frequencies higher than that of the incident photons (anti-Stokes frequencies) is minor relative to that at frequencies lower than that of the incident photons (Stokes frequencies). Consequently, it is the Stokes frequencies that are usually analyzed. Therefore, the energy released from these molecules is specific to these molecules, and the specific molecules can be identified by detecting the released energy as electromagnetic waves.

It is also well known that, when specific molecules are irradiated with radiant energy in the form of electromagnetic waves, the molecules absorb the radiant energy to be excited in electronic excitation states, and generate fluorescence when the same return to ground states. Such fluorescence sharply reflects energy transfer, relaxation, reaction etc. in the excited states of the molecules, and hence the same is generally utilized as means for recognizing the dynamics of the molecules.

The inventors are making study on qualification and determination of specific molecules through a fluorescence/Raman spectrum.

In light which is generated from a sample, Rayleigh scattered light having the same wavelength as excitation light has a high intensity, while the intensity of Raman scattered light or fluorescence having a wavelength shifted from that of the excitation light is by far small as compared with the Rayleigh scattered light intensity. The intensity of Raman scattered light or fluorescence is proportionate to the concentration of a component causing Raman scattering or generating fluorescence in the sample, and hence the Raman scattered light or fluorescence is further weakened in case of measuring a biological substance of a small component or the like.

A laser unit is generally employed as a light source for the Raman spectrometry. The intensity of a laser beam outgoing from the laser unit is varied with time. Since the intensity of Raman scattered light is varied with intensity fluctuation of excitation light, the Raman spectrophotometry cannot be correctly performed unless a detected Raman scattered light intensity is corrected by the intensity of the excitation light.

Correction with respect to an excitation light intensity is made also in fluometry. While temporal fluctuation of a light source light intensity is reduced following improvement in accuracy of a constant current source in case of employing a xenon lamp as an excitation light source of fluorescence, correction with respect to the excitation light intensity is still necessary in order to make measurement in higher accuracy. When a dye laser is employed as an excitation light source of fluorescence, on the other hand, correction with respect to the excitation light intensity is indispensable.

In order to correct fluctuation of a light source intensity, excitation light is divided into a sample beam and a correction beam, for irradiating a sample with the sample beam and detecting fluorescence or Raman scattered light from light which is generated from the sample. On the other hand, the correction beam is detected by another photodetector, for correcting the detected value of the fluorescence or Raman scattered light by that of the correction beam in general. In this case, however, different photodetectors are required for detecting the fluorescence or Raman scattered light and the correction beam respectively, and hence the size of a measuring apparatus as well as the cost are increased.

In another correction method, Rayleigh scattered light from a sample is detected simultaneously with detection of Raman scattered light by a detector therefor, for correcting the intensity of the Raman scattered light on the basis of the Rayleigh scattered light intensity. In this case, the Raman scattered light and the Rayleigh scattered light can be detected by the same detector, whereby an apparatus structure is simplified and the cost is advantageously reduced. However, the Rayleigh scattered light is varied with the sample depending on the concentration of the sample, and hence the Raman spectrometry cannot be correctly performed.

SUMMARY OF THE INVENTION

An object of the present invention is to enable correction based on fluctuation of an excitation light intensity with a simple system.

A spectral measuring method according to the present invention comprises steps of dividing excitation light of a single wavelength into a sample beam and a correction beam, irradiating a sample with the sample beam, selectively receiving at least either fluorescence or Raman scattered light as target light from light which is obtained from the sample by the irradiation with the sample beam after removing the same wavelength component as the excitation light, simultaneously introducing the received target light and the correction beam into a single spectroscope as a single light beam and separating the light beam into spectral components thereby obtaining a spectrum, finding a spectral intensity at a prescribed wavelength or an integral value in a proper wavelength range from the spectrum as a measured value, and correcting the measured value on the basis of a detected intensity of an excitation light component in the spectrum.

A spectral measuring apparatus according to the present invention comprises an excitation light source part which is provided with an excitation light source and a beam splitter for dividing a beam of a single wavelength obtained from the excitation light source into a sample beam and a correction beam, a sample part for irradiating a sample with the sample beam, an optical target adjusting part which is provided with filter means for removing the same wavelength component as excitation light from light generated from the sample irradiated with the sample beam and selecting at least either fluorescence or Raman scattered light as target light and an optical system for adjusting beams, a beam combining means for placing a beam outgoing from the optical target adjusting part and the correction beam on the same optical axis, a spectral processing part which is provided with a spectroscope for separating a beam outgoing from the beam combining means into its spectral components and a detector for detecting the spectral components separated by the spectroscope, and a data processing part which is provided with functions of finding a spectral intensity at a prescribed wavelength or an integral value in a proper wavelength range from a spectrum detected by the detector of the spectral processing part as a measured value and correcting the measured value on the basis of a detected intensity of an excitation light component in the spectrum.

The filter means provided in the optical target adjusting part is preferably prepared from any one of a holographic notch filter including an excitation light wavelength in its notch region, a cut filter including the excitation light wavelength and shielding a shorter wavelength side, a bandpass filter having characteristics of transmitting to remove an excitation light wavelength component while reflecting other wavelength components, and a holographic beam splitter removing the excitation light wavelength by transmission or reflection.

The holographic notch filter is adapted to shield only a desired wavelength region while transmitting wavelength light of other regions. When a filter which is so set that the excitation light wavelength is included in the shielded region (notch region) is employed, the beam outgoing from the optical target adjusting part includes only fluorescence and Raman scattered light, with no excitation light component. On the other hand, the correction beam, which includes only excitation light from the light source and does not pass through the sample, is not dependent on the sample but expresses intensity fluctuation from the light source with fidelity.

The spectral processing part can detect wavelength regions to be measured so that a fluorescence or Raman scattered light spectrum of a prescribed region and the excitation light can be simultaneously detected when the same is a polychrometer comprising a multi-channel photodetector for simultaneously detecting the wavelength regions to be measured. Consequently, no difference is caused between detection times for the wavelength of fluorescence or Raman scattered light and the excitation light. Also when a single-channel photodetector is employed as a photodetector so that the spectroscope performs wavelength scanning, fluctuation of the light source can be corrected if the wavelength scanning can be performed at a high speed by the spectroscope such as a Fourier transform spectroscope.

According to the present invention, the measured value of the target light such as fluorescence or Raman scattered light is corrected by an excitation light source intensity, whereby quantitative measurement of a substance of a low concentration component is carried out easily. In order to perform the correction, excitation light is divided into a sample beam and a correction beam, the same wavelength component as the excitation light is removed from light generated from a sample which is irradiated with the sample beam for selecting target light, the selected target light and the correction beam are simultaneously introduced into a single spectroscope and separated into spectral components for obtaining a spectrum, and the target light intensity is corrected on the basis of a detected intensity of an excitation light component in the spectrum, whereby only a single photodetector is sufficient, and a target light measuring apparatus can be implemented with a small space at a low cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
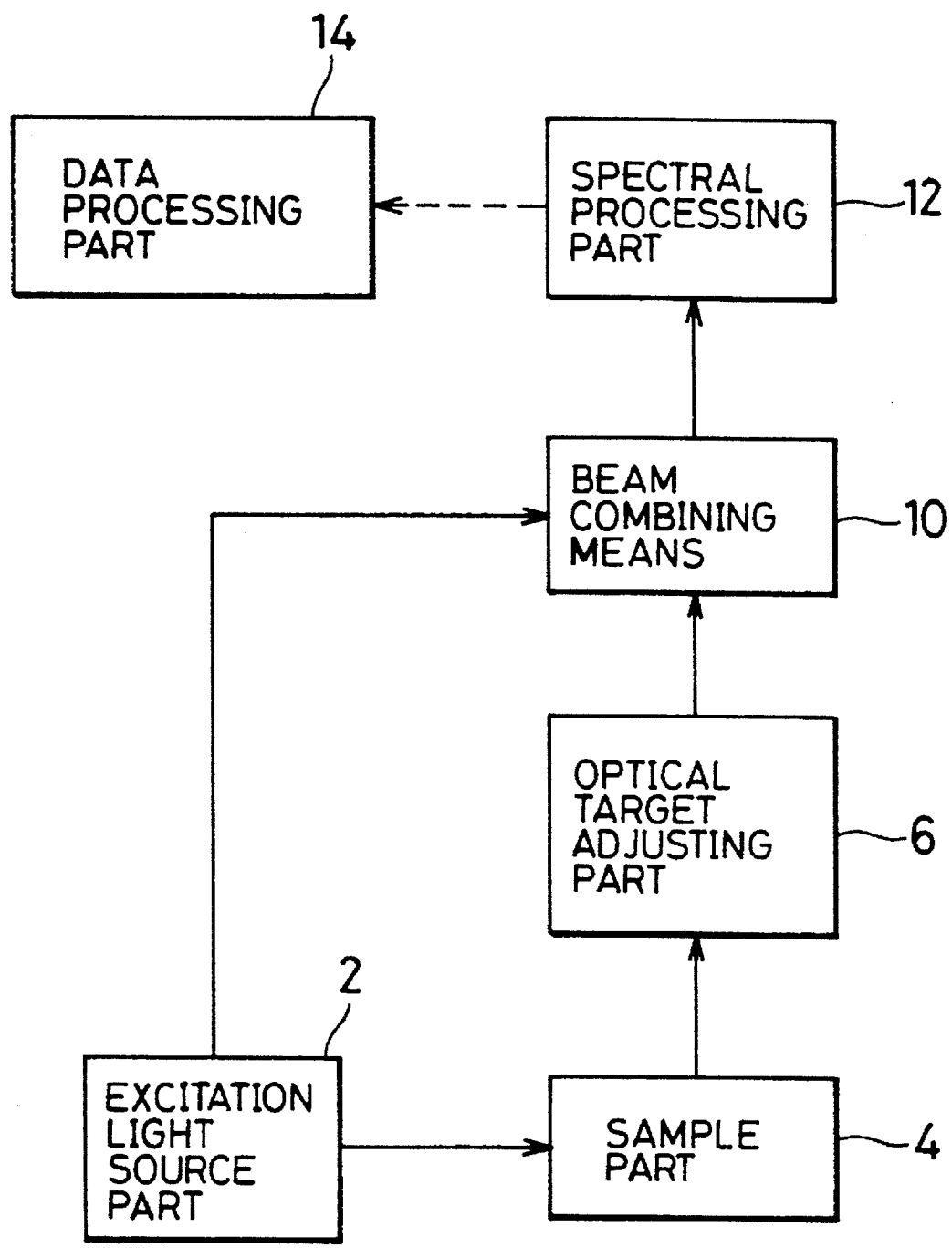
FIG. 1 is a block diagram schematically showing the present invention.

FIG. 1 schematically illustrates a measuring apparatus according to the present invention. An excitation light source part 2 comprises an excitation light source and a beam splitter for dividing a beam of a single wavelength which is emitted from the excitation light source into a sample beam and a correction beam. In a sample part 4, a sample is irradiated with the sample beam from the excitation light source part 2. An optical target adjusting part 6 comprises filter means for removing the same wavelength component as excitation light from light generated from the sample which is irradiated with the sample beam and selecting at least either fluorescence or Raman scattered light as target light and an optical system for adjusting beams. Wave combining means 10 places a beam outgoing from the optical target adjusting part 6 and the correction beam on the same optical axis. A spectral processing part 12 comprises a spectroscope for separating a beam outgoing from the beam combining means 10 into its spectral components and a detector for detecting the spectral components separated by the spectroscope. A data processing part 14 comprises a function of finding a spectral intensity at a prescribed wavelength or an integral value in a proper wavelength range from a spectrum detected by the detector of the spectral processing part 12 as a measured value and a function of correcting the measured value on the basis of a detected intensity of an excitation light component in the spectrum.

FIGS. 2 to 6 show embodiments expressing the block diagram of FIG. 1 in detail.

Figure 2:
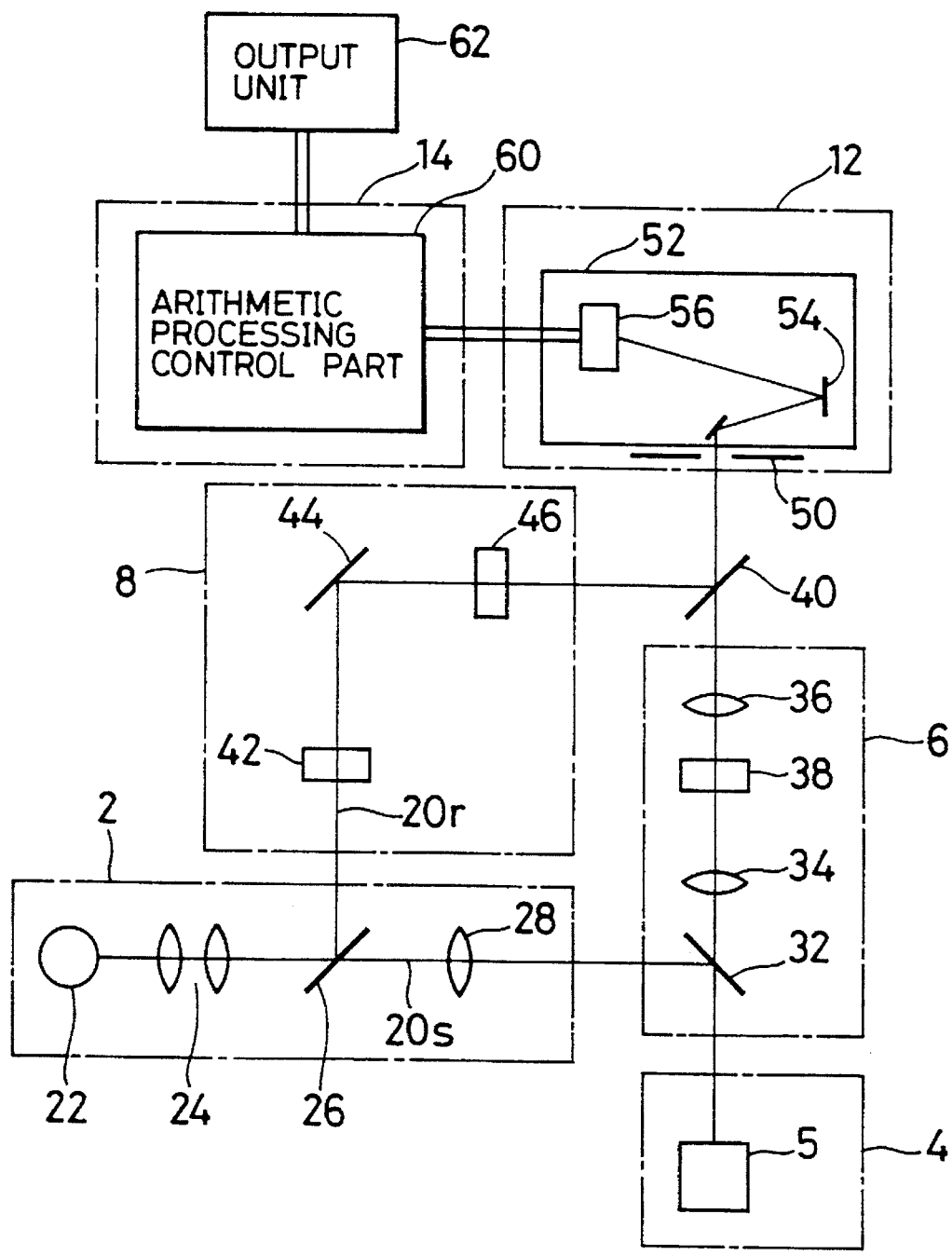
FIG. 2 is an arrangement diagram showing an embodiment employing a holographic notch filter as a filter means of an optical target adjusting part for receiving target light in a direction of 180 degrees with respect to excitation light for a sample.

FIG. 2 shows an embodiment employing a holographic notch filter including an excitation light wavelength in its notch region or a cut filter shielding an excitation light wavelength and a shorter wavelength side therefrom as filter means of an optical target adjusting part 6 for receiving fluorescence or Raman scattered light in a direction of 180 degrees with respect to excitation light for a sample.

An excitation light source part 2 is provided with a light source 22, while a half mirror 26 is arranged as a beam splitter for dividing excitation light from the light source 22 into a sample beam 20s and a correction beam 20r. The light source 22 is prepared from a laser unit, a xenon lamp or a halogen lamp. The laser unit, which can be prepared from a continuously oscillating Ar ion laser unit, a Kr ion laser unit, an He—Ne laser unit, an He—Cd laser unit, or a pulse laser unit such as an Nd:YAG laser unit, can be selected from those of wide wavelength ranges over near ultraviolet to near infrared regions. On the other hand, the xenon lamp or the halogen lamp generating multi-wavelength light is combined with a spectroscope.

A light source condenser lens 24 and a convergent lens 28 are arranged on both sides of the half mirror 26 in the excitation light source part 2, in order to converge the sample beam 20s on a sample 5 in a sample part 4.

The sample 5 is stored in a cell and set in the sample part 4 in case that the same is prepared from a liquid. In case that the sample 5 is prepared from a solid such as an organism, on the other hand, the same is directly set in the sample part 4, with no employment of a cell.

The sample beam 20s outgoing from the excitation light source part 2 is reflected by a half mirror 32 which is arranged in the optical target adjusting part 6, and applied to the sample 5 which is set in the sample part 4. The optical target adjusting part 6 is provided with condenser lenses 34 and 36, in order to converge fluorescence and Raman scattered light from the sample 5 which are transmitted through the half mirror 32 on an inlet slit 50 of a spectroscope 52 as target light. Light which is incident upon the optical target adjusting part 6 from the sample 5 also includes Rayleigh scattered light in addition to the target light. Therefore, a holographic notch filter 38 which is set to include the wavelength of the excitation light in its notch region is arranged in the optical target adjusting part 6 as a filter for removing the same wavelength component as the excitation light and selecting the target light. Such a holographic notch filter is available on Kaiser Optical Systems Inc., U.S.A., for example. The holographic notch filter 38 has characteristics of completely shielding wavelength light included in the notch region and transmitting light of other wavelength regions by at least 80%, for example.

A half mirror 40 is arranged as a beam combining means between the condenser lens 36 of the optical target adjusting part 6 and the inlet slit 50 of the spectroscope 52, so that the target light is transmitted through this half mirror 40 and incident upon the spectroscope 52.

An optical adjusting part 8 for correction is set for guiding the correction beam 20r which is divided by the half mirror 26 in the excitation light source part 2 to the half mirror 40 of the beam combining means. An extinction filter 42 for damping the quantity of light, a bandpass filter 46 for shielding wavelength light which is generated in the half mirror 26 of the excitation light source part 2 or shielding a sideband from a laser beam when the excitation light source 2 is prepared from a laser unit, and a mirror 44 for bending the light path are arranged on the optical adjusting part 8 for correction. The correction beam 20r which is guided to the inlet slit 50 through the half mirror 40 by the optical adjusting part 8 for correction is condensed on the inlet slit 50 by the light source condenser lens 24.

In order to shield the sideband of the laser beam from both of the sample and correction beams 20s and 20r, the bandpass filter 46 may alternatively be arranged on the light path between the light source 22 and the half mirror 26.

The target light outgoing from the optical target adjusting part 6 and the correction beam 20r which is guided from the optical adjusting part 8 for correction are guided onto the same optical axis by the half mirror 40, to be guided to the spectroscope 52 of a spectral processing part 12 through the inlet slit 50. The spectroscope 52 is formed by a polychrometer, which comprises a diffraction grating 54 for separating incident light into its spectral components and a multi-channel photodetector 56 which is provided with a plurality of photodetecting elements along the direction of dispersion of the diffraction grating 54 for simultaneously detecting the spectral components separated by the diffraction grating 54 over a prescribed wavelength region.

Numeral 60 denotes an arithmetic processing control part which controls the operations of the respective parts and processes signals detected by the photodetector 56. This arithmetic processing control part 60 also includes a function as a data processing part for correcting a detected intensity of the target light on the basis of a detected intensity of an excitation light component in a spectrum which is detected by the photodetector 56, and operates a target spectrum in which fluctuation of the light source is corrected and performs qualification and determination of a sample from the target light intensity. Numeral 62 denotes an output unit outputting data processed in the arithmetic processing control part 60 such as a printer or a display.

In the embodiment shown in FIG. 2, the holographic notch filter 38 may be replaced with a sharp cut filter having sharp wavelength characteristics shielding an excitation light wavelength and a shorter wavelength side therefrom.

Figure 3:
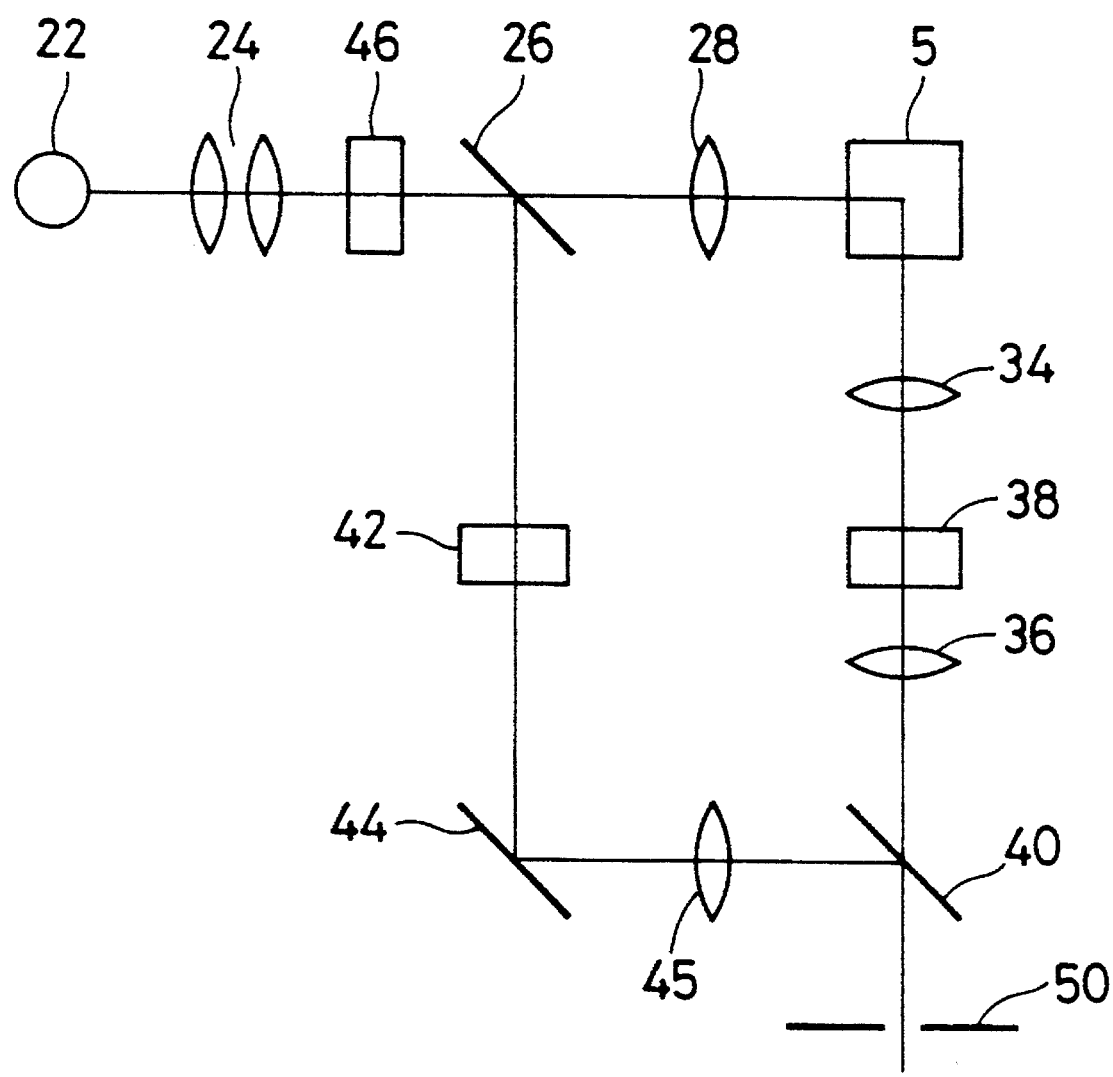
FIG. 3 is an arrangement diagram showing an embodiment employing a holographic notch filter as a filter means of an optical target adjusting part for receiving target light in a direction of 90 degrees with respect to excitation light for a sample.

FIG. 3 illustrates an embodiment employing a holographic notch filter or a cut filter as a filter means of an optical target adjusting part 6 similarly to the embodiment shown in FIG. 2. However, this embodiment is adapted to receive target light in a direction of 90 degrees with respect to excitation light for a sample. In this case, no half mirror 32 is necessary for irradiating a sample 5 with a sample beam 20s and making scattered light from the sample 5 incident upon a condenser lens 34 of the optical target adjusting part 6. The sample beam 20s is converged by a light source condenser lens 24 and a convergent lens 28 of an excitation light source part 2 and directly applied to the sample 5, so that the scattered light from the sample 5 is directly incident upon the condenser lens 34 of the optical target adjusting part 6.

While the bandpass filter 46 is arranged on the light path of the optical adjusting part 8 for correction in FIG. 2, that in FIG. 3 is arranged on a light path in front of a beam splitter 26. It is possible to shield a sideband of a laser beam from both of the sample and correction beams by arranging the bandpass filter 46 on the position shown in FIG. 3.

While a condenser lens 45 is further arranged on the light path of an optical adjusting part for correction in FIG. 3, this lens 45 is adapted to condense the correction beam on the position of a slit 50 for adjusting the quantity of light, and is not necessary if the quantity of the correction beam is sufficiently high.

Figure 4A:
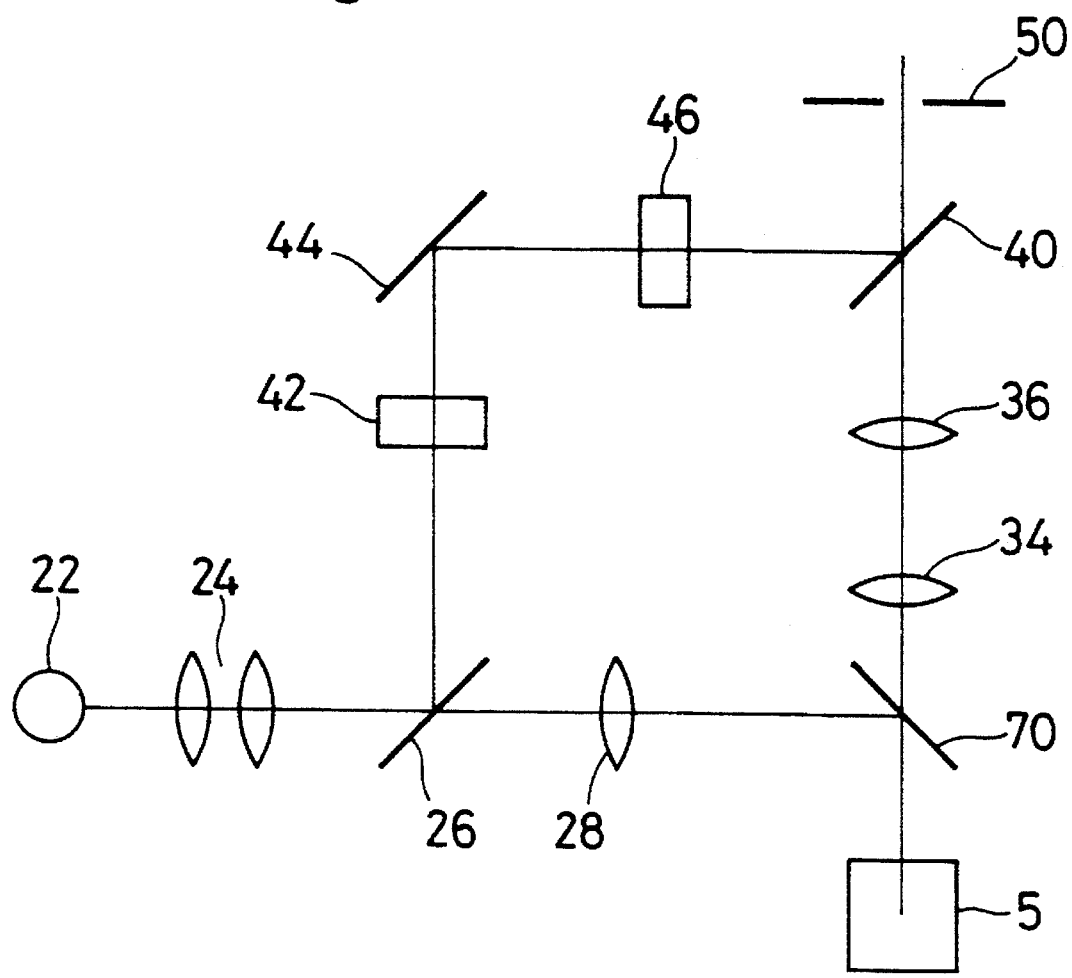
FIG. 4A is an arrangement diagram showing an embodiment employing a holographic beam splitter as a filter means of an optical target adjusting part for receiving target light in a direction of 180 degrees with respect to excitation light for a sample.

FIG. 4A illustrates an embodiment employing a holographic beam splitter 70 having characteristics of reflecting excitation light and transmitting fluorescence and Raman light as a filter means of an optical target adjusting part 6 for receiving target light in a direction of 180 degrees with respect to excitation light for a sample.

Figure 4B:
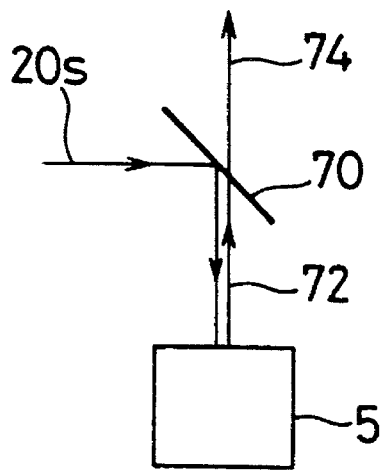
FIG. 4B is a sectional view schematically showing the holographic beam splitter part in the embodiment shown in FIG. 4A.

As shown in FIG. 4B, the holographic beam splitter 70 reflects a sample beam 20s, applies the same to a sample 5, and transmits only target light 74 in light 72 from the sample 5 including the target light and Rayleigh scattered light for making the same incident upon a condenser lens 34 of the optical target adjusting part 6.

Figure 5A:
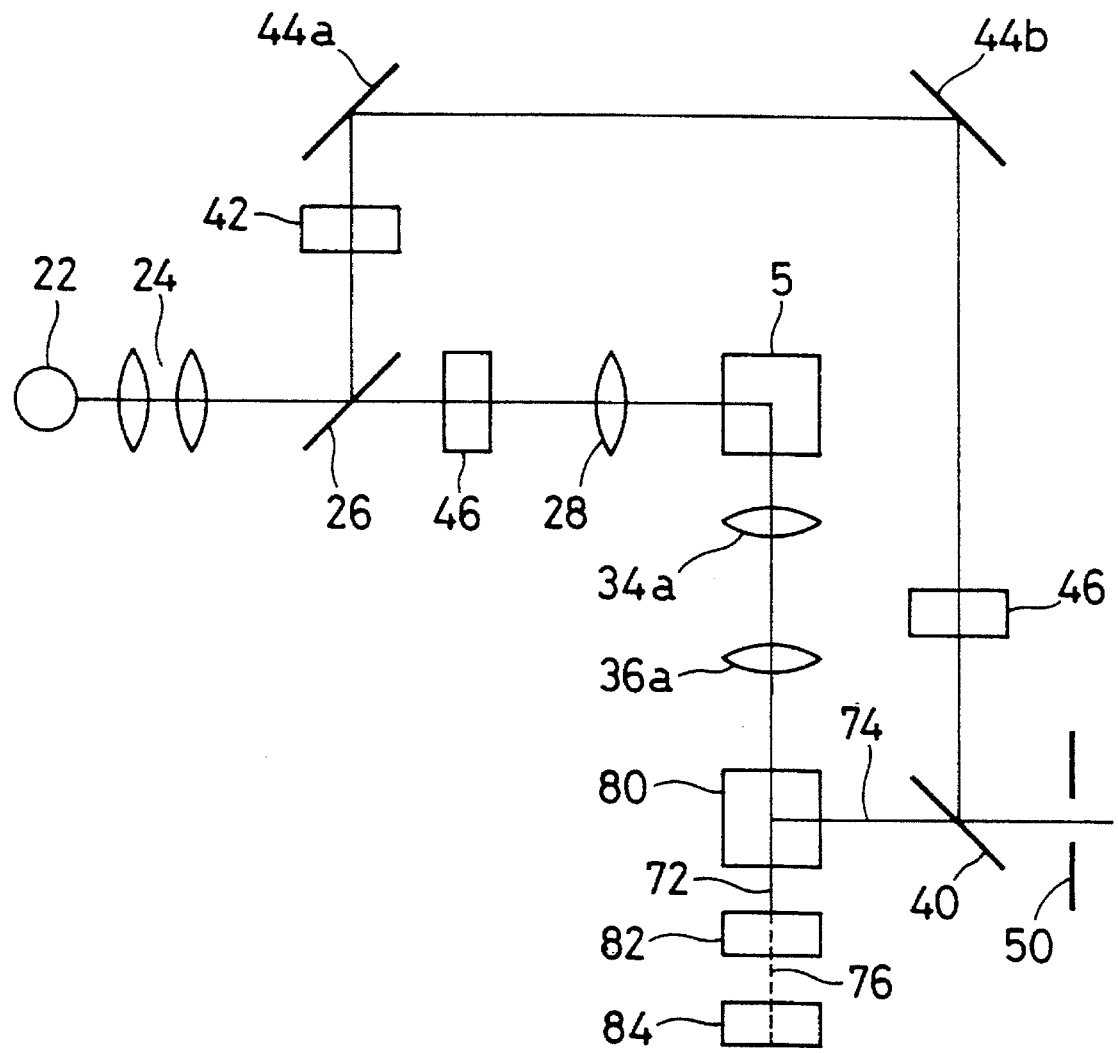
FIG. 5A is an arrangement diagram showing an embodiment employing a bandpass filter as a filter means of an optical target adjusting part for receiving target light in a direction of 90 degrees with respect to excitation light for a sample.

FIG. 5A illustrates an embodiment employing a bandpass filter 82 having characteristics of transmitting and removing an excitation light wavelength component and reflecting a target light component as a filter means of an optical target adjusting part 6. In this case, target light is received in a direction of 90 degrees with respect to excitation light for a sample.

Figure 5B:
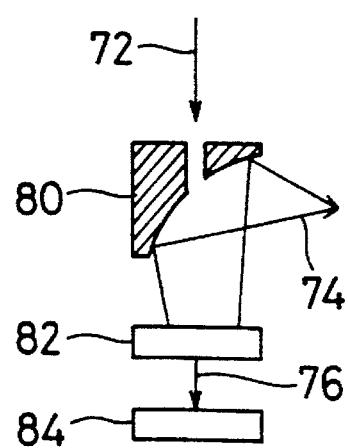
FIG. 5B is a sectional view schematically showing the bandpass filter part in the embodiment shown in FIG. 5A.

As shown in FIG. 5B, the bandpass filter 82 is arranged on a mirror face side of a transmission/condensation mirror 80, while a beam stopper 84 is arranged on an opposite side to the transmission/condensation mirror 80.

Light 72 from a sample 5 including target light and Rayleigh scattered light is condensed by condenser lenses 34a and 34b, to be incident upon the bandpass filter 82 from a back surface of the transmission/condensation mirror 80 through its incidence hole. Rayleigh light 76 is transmitted through the bandpass filter 82 and absorbed by the beam stopper 84, while target light 74 is reflected and condensed by the mirror face of the transmission/condensation mirror 80 to be incident upon a spectroscope from an inlet slit 50 through a half mirror 40. Two mirrors 44a and 44b are arranged in an optical adjusting part 8 for correction, in order to bend a light path by 180 degrees.

Figure 6:
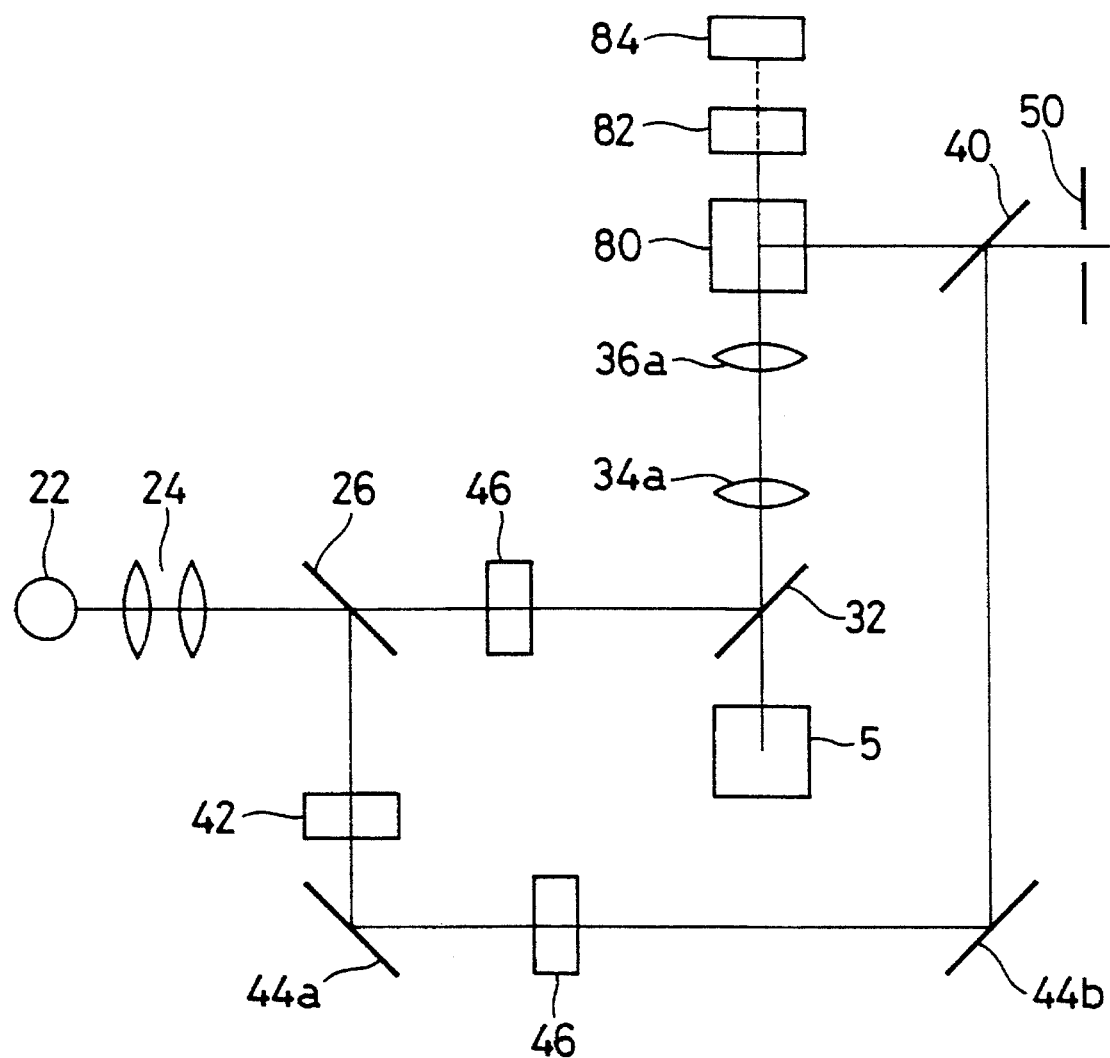
FIG. 6 is an arrangement diagram showing an embodiment employing a bandpass filter as a filter means of an optical target adjusting part for receiving target light in a direction of 180 degrees with respect to excitation light for a sample.

FIG. 6 illustrates an embodiment employing a bandpass filter 82 having characteristics of transmitting and removing an excitation light wavelength component and reflecting a target light component as a filter means of an optical target adjusting part 6, similarly to FIG. 5. However, this embodiment receives target light in a direction of 180 degrees with respect to excitation light for a sample. A half mirror 32 is arranged for applying a sample beam 20s to a sample 5 and making light from the sample 5 incident upon a condenser lens 34a of the optical target adjusting part.

The direction for receiving the target light from the sample is not restricted to that of 90 or 180 degrees, but may be that of another arbitrary angle.

Examples measuring target light with the apparatus shown in FIG. 2 are now described. A concave diffraction grating having 150 grooves/mm and resolution of 5 cm$^{-1}$ was employed as the diffraction grating 54 of the spectral processing part 12, and a CCD optical detecting element was employed as the photodetector 56.

FIGS. 7A, 7B, 8A and 8B illustrate Examples measuring Raman scattered light, in which an argon ion laser beam was employed as the light source 22.

Figure 7A:
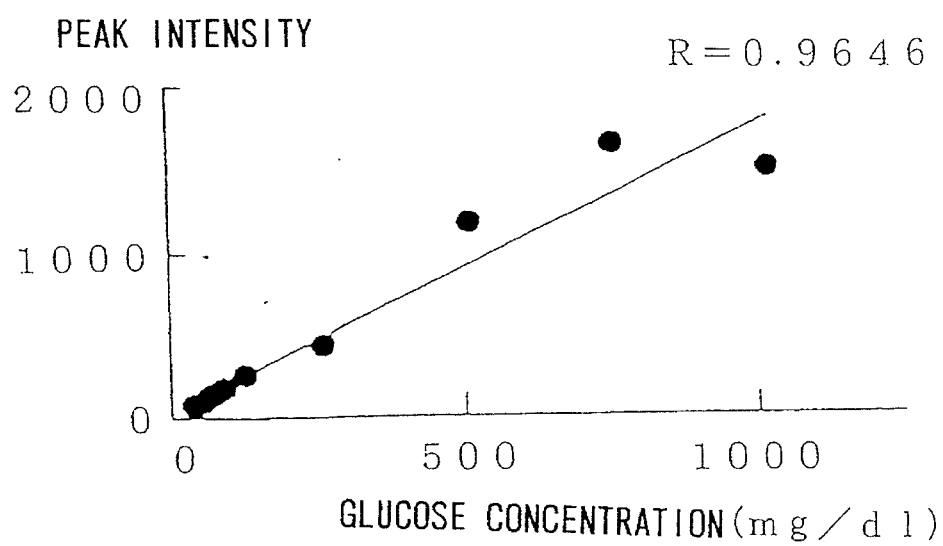
FIGS. 7A and 7B are graphs showing correlations between Raman scattered light intensities and glucose concentrations in case of applying the present invention to measurement of aqueous glucose without and with correction by light source intensities respectively.
Figure 7B:
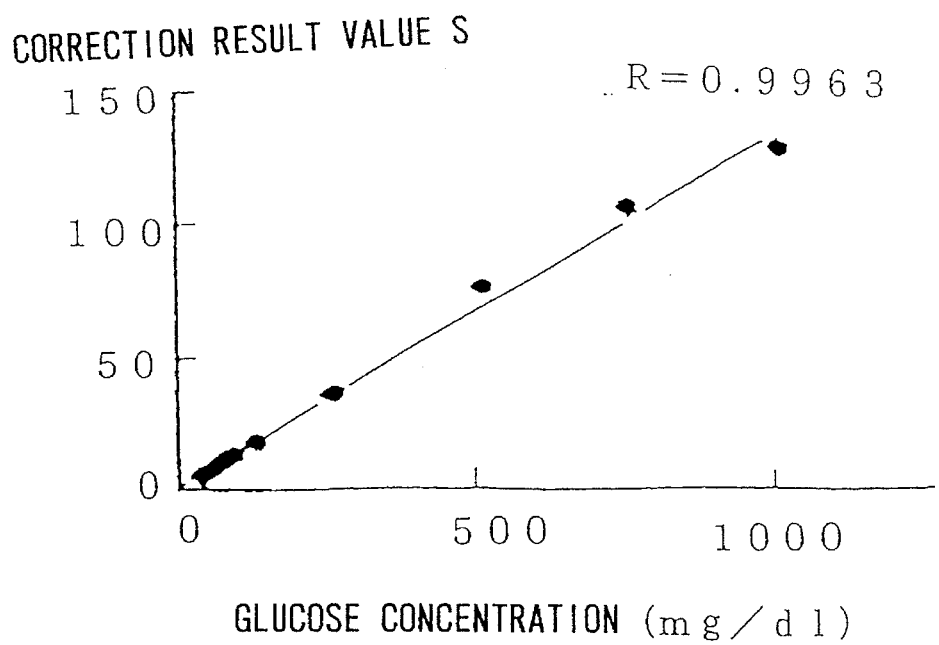

FIGS. 7A and 7B show Example measuring peak intensities $I_{2918}$ of Raman scattered light peaks around an excitation light wavelength of 514.5 nm to a Raman shift wavenumber of 2918 cm$^{-1}$. FIG. 7A shows actual intensities $I_{2918}$ with no correction by fluctuation of a light source intensity, while FIG. 7B shows correction result values S with correction by fluctuation of a light source intensity with a correction beam intensity value $I_{514}$. The correction result values S were calculated by the following equation as to measured values at the respective concentrations:

$$S = \frac{\text{(Raman scattered light intensity } I_{2918}\text{)}}{\text{(correction beam intensity value } I_{514}\text{)}}$$

As to glucose concentrations, prepared aqueous glucose samples were measured with an automatic glucose measurer GA-1120 (product by KDK Corporation).

From the results shown in FIGS. 7A and 7B, a correlation coefficient R between the actual glucose intensities and the glucose concentrations was 0.9646 before correction by the light source intensity, while a correlation coefficient R between the correction result values S corrected by the light source intensity and the glucose concentrations was improved to 0.9963. It is understood that accuracy in case of determining a glucose concentration from a Raman scattered light intensity while employing the results of the correlation as a calibration curve is improved by making correction by a light source intensity.

The correlation coefficients R were calculated by the following equation:

$$R = \frac{\sum_{i=1}^{n}[(xi-X)(yi-Y)]}{\sqrt{\left[\sum_{i=1}^{n}(xi-X)^2\right]\left[\sum_{i=1}^{n}(yi-Y)^2\right]}}$$

where n represents the number of measured samples, xi represents the concentration of each point of the measured samples, yi represents a measured light intensity with respect to xi, X represents an average value of concentrations of respective points of the measured samples, and Y represents an average value of measured light intensities.

Figure 8A:
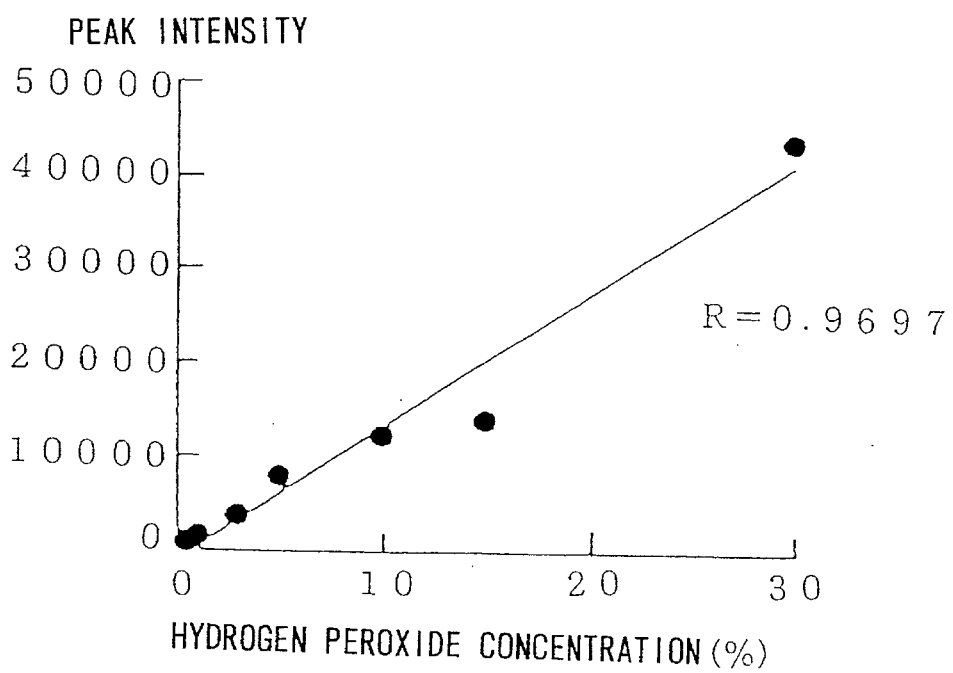
FIGS. 8A and 8B are graphs showing correlations between Raman scattered light intensities and hydrogen peroxide concentrations in Example applying the present invention to measurement of aqueous hydrogen peroxide without and with correction by light source intensities respectively.
Figure 8B:
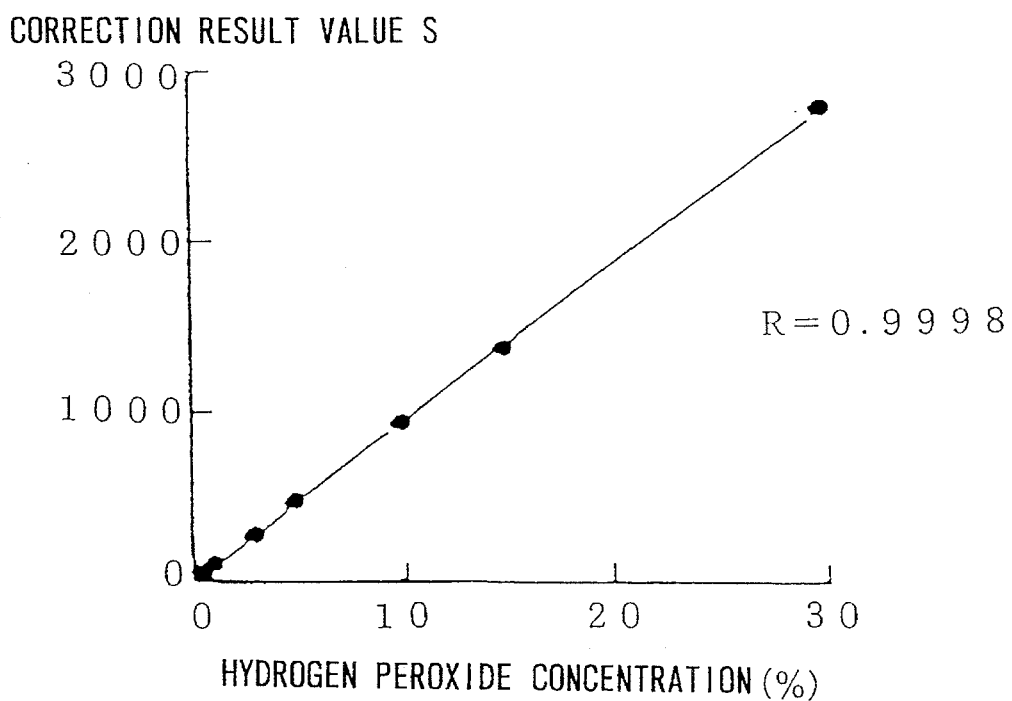

FIGS. 8A and 8B illustrate Example measuring aqueous hydrogen peroxide. In this case, peak intensities of Raman scattering peaks around a Raman shift wavenumber 878 $cm^{-1}$ from an excitation light wavelength of 514.5 nm were measured. Also in this case, a coefficient R of correlation between peak intensities and hydrogen peroxide concentrations was 0.9697 with no correction by a light source intensity, while a correlation coefficient R of correction result values S subjected to correction of the light source intensity was improved to 0.9998.

While the peak intensities of Raman scattering peaks were measured for making determination in the above Examples, the present invention is similarly applicable to a case of finding peak areas which are integral values in place of the peak intensities for making determination.

FIGS. 9A to 12B illustrate Examples measuring fluorescence, in which an He—Ne laser unit was employed as the light source 22.

Figure 9A:
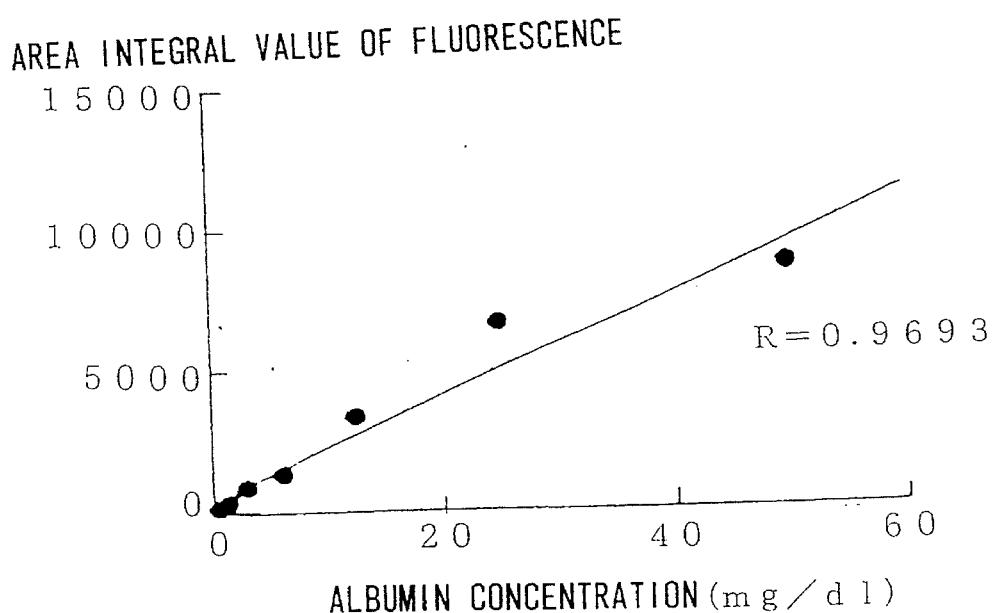
FIGS. 9A and 9B are graphs showing correlations between area integral values of a fluorescence spectrum and albumin concentrations in Example applying the present invention to measurement of aqueous albumin without and with correction by light source intensities respectively.
Figure 9B:
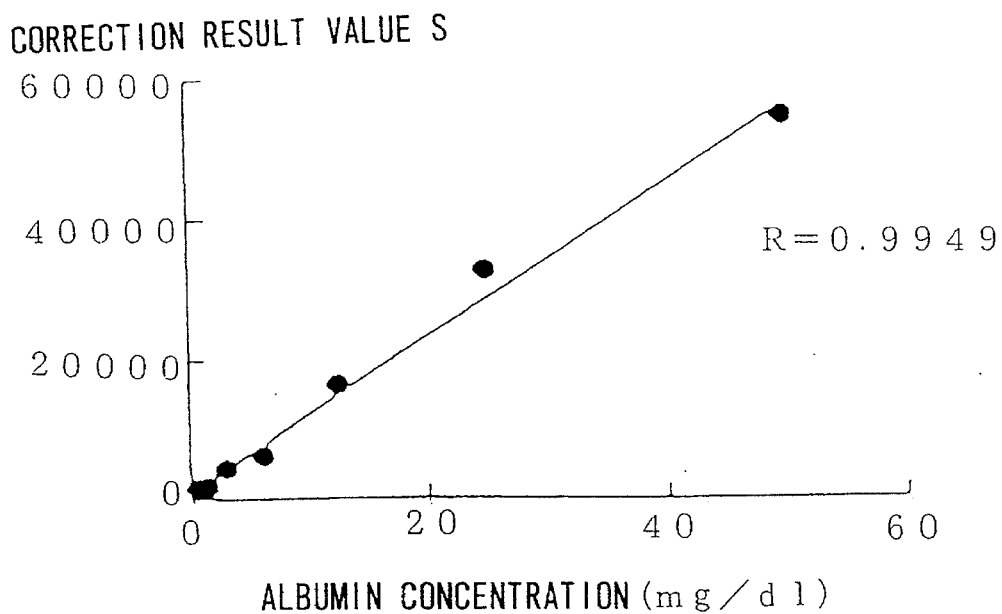

FIGS. 9A and 9B illustrate Example measuring area integral values of a fluorescence spectrum in the range of shift wave numbers of 416.5 $cm^{-1}$ to 1434.7 $cm^{-1}$ from an excitation light wavelength of 632.8 nm in samples of various albumin concentrations. FIG. 9A shows actual intensities I with no correction by fluctuation of a light source intensity, and FIG. 9B shows correction result values S subjected to correction by fluctuation of the light source intensity with a correction beam intensity value $I_{632}$. The correction result values S were calculated by the following equation as to measured values at the respective concentrations:

$$S = \frac{\text{(fluorescence area integral value } I \text{ of each concentration)}}{\text{(correction beam intensity value } I_{632})} \times 100$$

From the results shown in FIGS. 9A and 9B, a correlation coefficient R between fluorescence area integral values I and the albumin concentrations was 0.9693 before correction by the light source intensity, while a coefficient R of correction between the correction result values S corrected by the light source intensity and the albumin concentrations was improved to 0.9949. It is understood that accuracy in case of determining an albumin concentration from a fluorescence area integral value while employing the results of the correlation as a calibration curve is improved by making correction by a light source intensity.

Figure 10A:
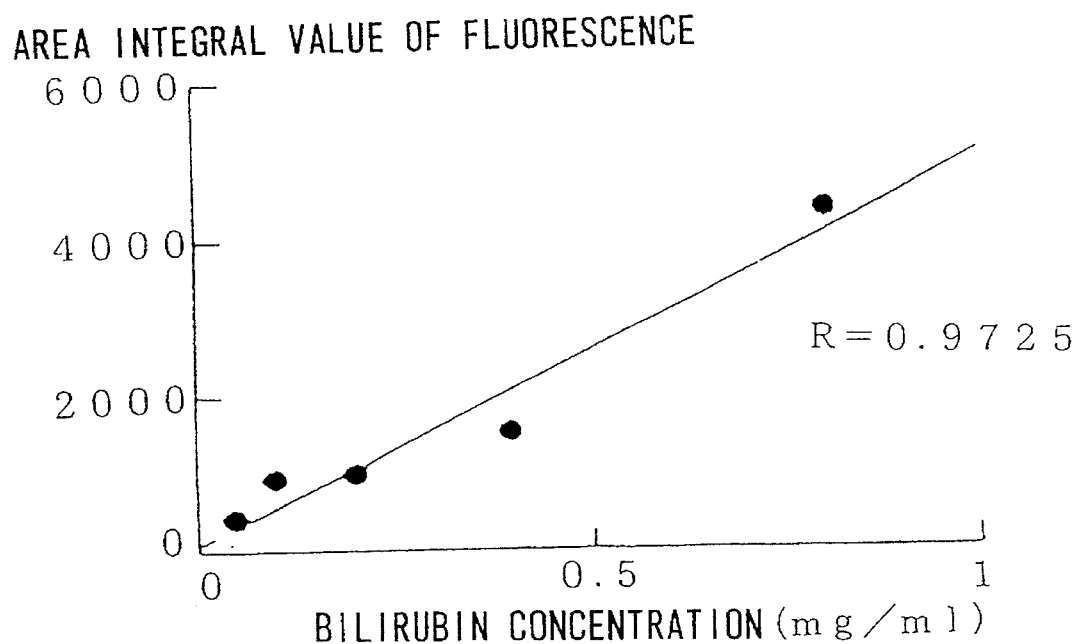
FIGS. 10A and 10B are graphs showing correlations between area integral values of a fluorescence spectrum and bilirubin concentrations in Example applying the present invention to measurement of aqueous bilirubin without and with correction by light source intensities respectively.
Figure 10B:
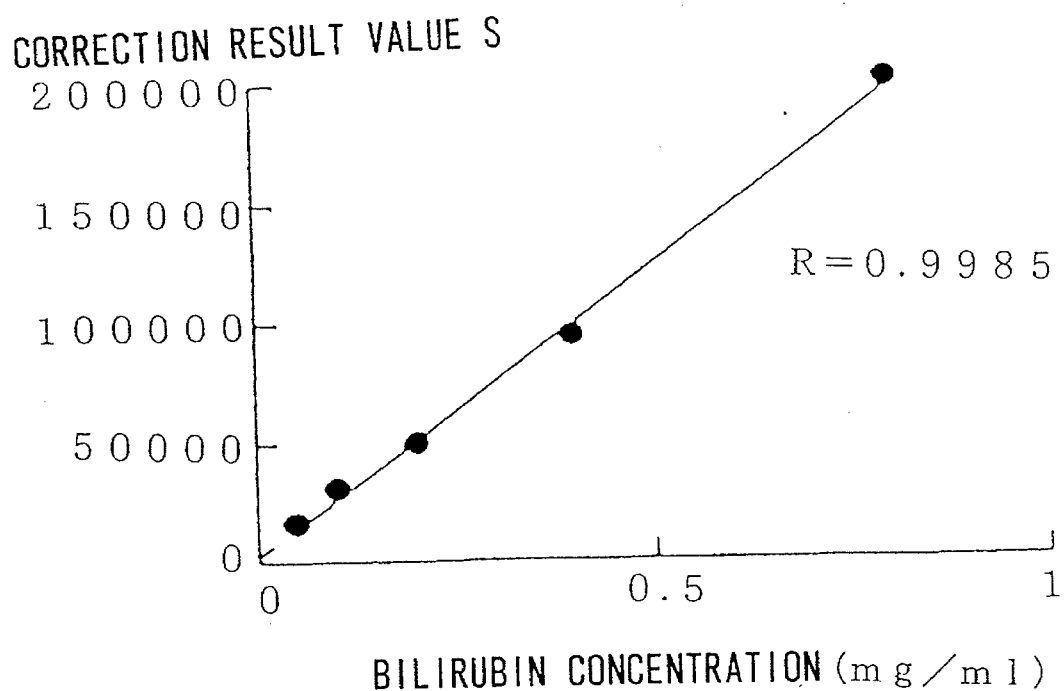

FIGS. 10A and 10B illustrate Example measuring area integral values of a fluorescence spectrum in the range of shift wavenumbers of 416.5 $cm^{-1}$ to 1434.7 $cm^{-1}$ from an excitation light wavelength of 632.8 nm in samples of various ditaurobilirubin (bilirubin) concentrations. FIG. 10A shows actual intensities I with no correction by fluctuation of a light source intensity, and FIG. 10B shows correction result values S subjected to correction by fluctuation of a light source intensity with a correction beam intensity value $I_{632}$.

From the results shown in FIGS. 10A and 10B, a correlation coefficient R between fluorescence area integral values I and the bilirubin concentrations was 0.9725 before correction by the light source intensity, while a coefficient R of correction between the correction result values S corrected by the light source intensity and the bilirubin concentrations was improved to 0.9985. It is understood that accuracy in case of determining a bilirubin concentration from a fluorescence area integral value while employing the results of the correlation as a calibration curve is improved by making correction by a light source intensity.

Figure 11A:
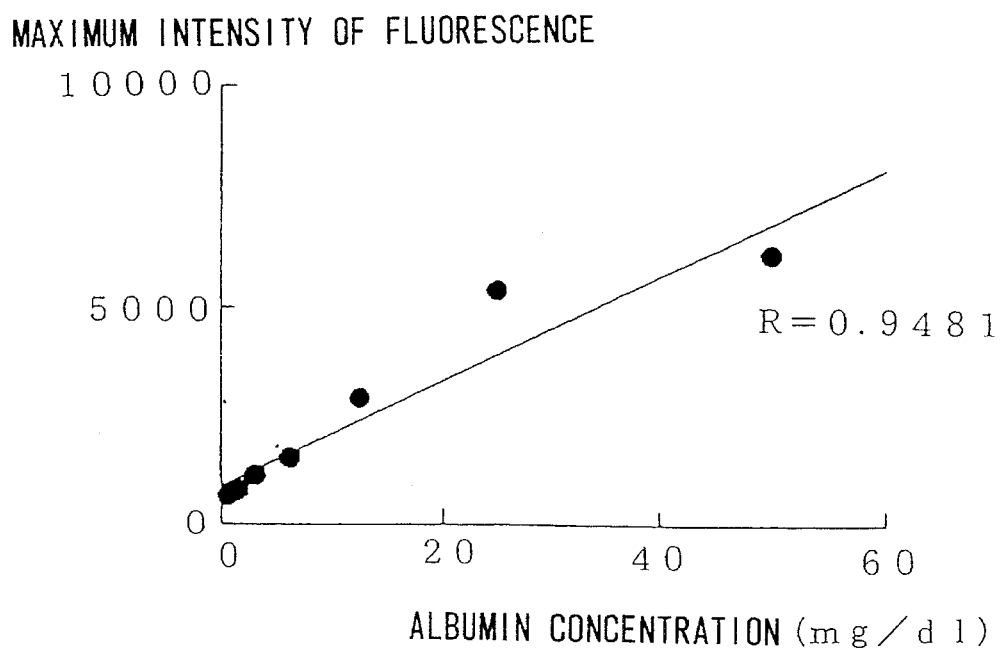
FIGS. 11A and 11B are graphs showing correlations between fluorescence spectral intensities and albumin concentrations in Example applying the present invention to measurement of aqueous albumin without and with correction by light source intensities respectively.
Figure 11B:
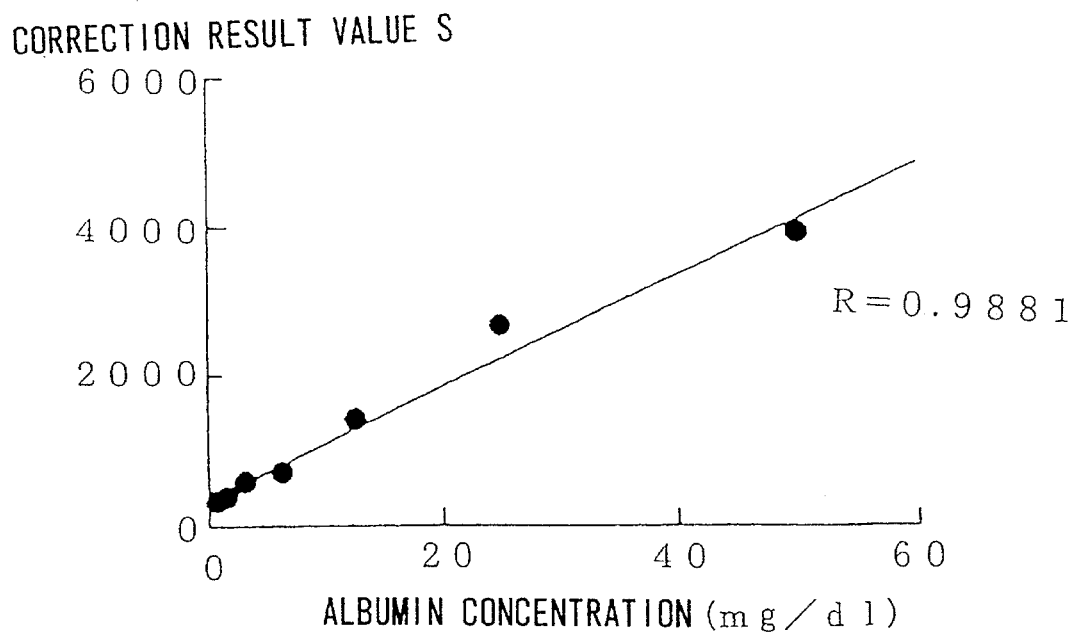

FIGS. 11A and 11B show Example measuring maximum fluorescence intensities I at a shift wavenumber of 805 $cm^{-1}$ from an excitation light wavelength of 632.8 nm in samples of various albumin concentrations. FIG. 11A shows actual intensities I with no correction by fluctuation of a light source intensity, and FIG. 11B shows correction result values S with correction by fluctuation of a light source intensity with a correction beam intensity value $I_{632}$. The correction result values S were calculated by the following equation as to measured values at the respective concentrations:

$$S = \frac{\text{(maximum fluorescence intensity } I \text{ of each concentration)}}{\text{(correction beam intensity value } I_{632})} \times 100$$

From the results shown in FIGS. 11A and 11B, a correlation coefficient R between fluorescence area integral values I and the albumin concentrations was 0.9482 before correction by the light source intensity, while a coefficient R of correction between the correction result values S corrected by the light source intensity and the albumin concentrations was improved to 0.9881. It is understood that accuracy in case of determining an albumin concentration from a fluorescence area integral value while employing the results of the correlation as a calibration curve is improved by making correction by a light source intensity.

Figure 12A:
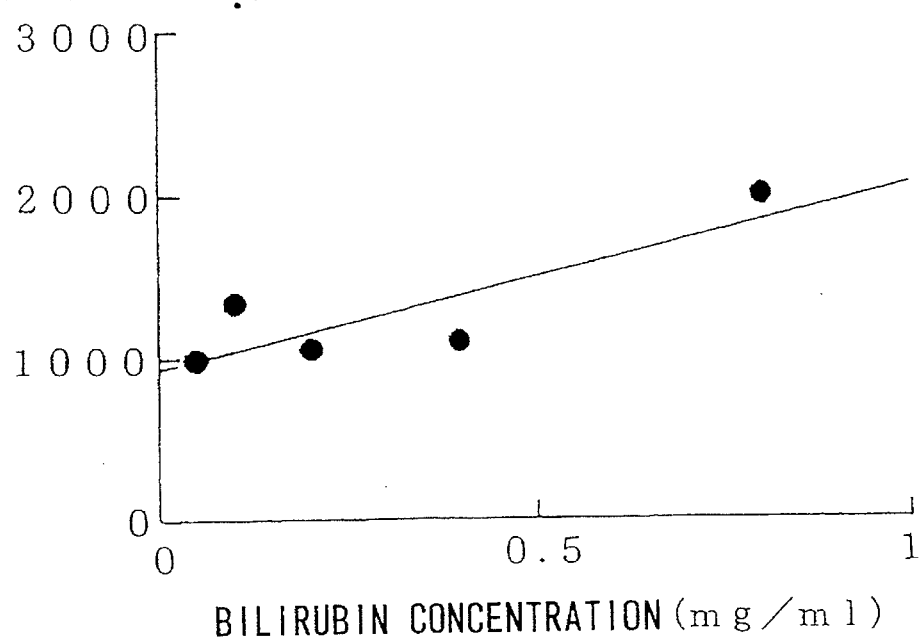
FIGS. 12A and 12B are graphs showing correlations between fluorescence spectral intensities and bilirubin concentrations in Example applying the present invention to measurement of aqueous bilirubin without and with correction by light source intensities respectively.
Figure 12B:
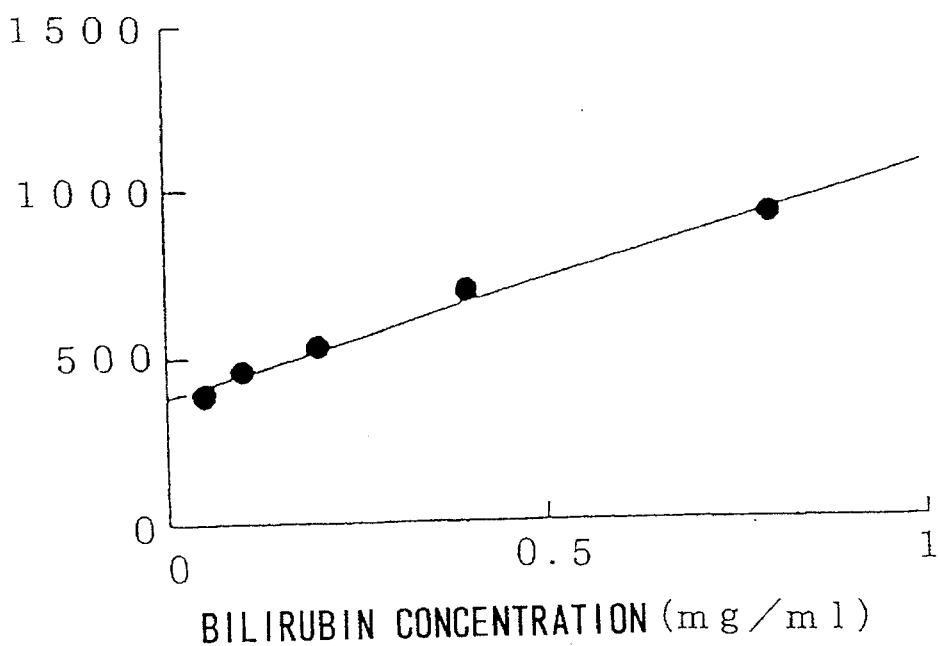

FIGS. 12A and 12B show Example measuring maximum fluorescence intensities I at a shift wavenumber of 1308 $cm^{-1}$ from an excitation light wavelength of 632.8 nm in samples of various bilirubin concentrations. FIG. 12A shows actual intensities I with no correction by fluctuation of a light source intensity, and FIG. 12B shows correction result values S with correction by fluctuation of a light source intensity with a correction beam intensity value $I_{632}$.

From the results shown in FIGS. 12A and 12B, a correlation coefficient R between fluorescence area integral values I and the bilirubin concentrations was 0.8400 before correction by the light source intensity, while a correlation coefficient R between the correction result values S corrected by the light source intensity and the bilirubin concentrations was improved to 0.9932. It is understood that accuracy in case of determining a bilirubin concentration from a fluorescence area integral value while employing the results of the correlation as a calibration curve is improved by making correction by a light source intensity.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A spectral measuring method comprising steps of: dividing excitation light of a single wavelength into a sample beam and a correction beam;

irradiating a sample with said sample beam;

selectively receiving at least either fluorescence or Raman scattered light as target light from light being obtained from said sample by said irradiation with said sample beam after removing the same wavelength component as said excitation light;

simultaneously introducing received said target light and said correction beam into a single spectroscope as a single light beam and separating the light beam into spectral components thereby obtaining a spectrum;

finding a spectral intensity at a prescribed wavelength or an integral value in a proper wavelength range from said spectrum as a measured value; and correcting said measured value on the basis of a detected intensity of an excitation light component in said spectrum.

2. A spectral measuring apparatus comprising:

an excitation light source part being provided with a light source and a beam splitter for dividing a excitation light beam being obtained from said excitation light source into a sample beam and a correction beam;

a sample part for irradiating a sample with said sample beam;

an optical target adjusting part being provided with filter means for removing the same wavelength component as excitation light from light being generated from said sample being irradiated with said sample beam and selecting at least either fluorescence or Raman scattered light as target light and an optical system for adjusting beams;

a beam combining means for placing a beam outgoing from said optical target adjusting part and said correction beam on the same optical axis;

a spectral processing part being provided with a spectroscope for separating a beam outgoing from said beam combining means into its spectral components and a detector for detecting said spectral components being separated by said spectroscope; and a data processing part having functions of finding a spectral intensity at a prescribed wavelength or an integral value in a proper wavelength range from a spectrum being detected by said detector of said spectral processing part as a measured value and correcting said measured value on the basis of a detected intensity of an excitation light component in said spectrum.

3. The spectral measuring apparatus in accordance with claim 2, wherein said light source is a laser unit.

4. The spectral measuring apparatus in accordance with claim 2, wherein said light source is a lamp combined with a spectroscope.

5. The spectral measuring apparatus in accordance with claim 2, wherein said filter means in said optical target adjusting part is a holographic notch filter including an excitation light wavelength in its notch region.

6. The spectral measuring apparatus in accordance with claim 2, wherein said filter means in said optical target adjusting part is a cut filter shielding an excitation light wavelength and a shorter wavelength side therefrom.

7. The spectral measuring apparatus in accordance with claim 2, wherein said filter means in said optical target adjusting part is a bandpass filter having characteristics of transmitting to remove an excitation light wavelength component while reflecting other wavelength components.

8. The spectral measuring apparatus in accordance with claim 2, wherein said filter means in said optical target adjusting part is a holographic beam splitter removing an excitation light wavelength by transmission or reflection.

9. The spectral measuring apparatus in accordance with claim 2, wherein said spectral processing part is a polychrometer comprising a multi-channel photodetector for simultaneously detecting wavelength regions to be measured.

10. The spectral measuring apparatus in accordance with claim 2, wherein said spectral processing part is a dispersive and scanning type spectroscope.

* * * * *